(12) United States Patent
Iwatsuka et al.

(10) Patent No.: US 9,244,296 B2
(45) Date of Patent: Jan. 26, 2016

(54) OPTICAL MODULATOR

(71) Applicant: TDK CORPORATION, Tokyo (JP)

(72) Inventors: Shinji Iwatsuka, Tokyo (JP); Kenji Sasaki, Tokyo (JP); Masamichi Taniguchi, Tokyo (JP)

(73) Assignee: TDK CORPORATION, Tokyo (JP)

(*) Notice: Subject to any disclaimer, the term of this patent is extended or adjusted under 35 U.S.C. 154(b) by 0 days.

(21) Appl. No.: 14/528,183

(22) Filed: Oct. 30, 2014

(65) Prior Publication Data
US 2015/0138619 A1    May 21, 2015

(30) Foreign Application Priority Data

Nov. 15, 2013  (JP) .................. 2013-237065

(51) Int. Cl.
*G02F 1/03* (2006.01)
*G02B 6/10* (2006.01)
*G02F 1/035* (2006.01)
*G02F 1/225* (2006.01)

(52) U.S. Cl.
CPC .............. *G02F 1/0316* (2013.01); *G02F 1/035* (2013.01); *G02F 1/225* (2013.01); *G02F 2201/07* (2013.01)

(58) Field of Classification Search
USPC .................. 359/237, 245, 254; 385/129–132
See application file for complete search history.

(56) References Cited

FOREIGN PATENT DOCUMENTS

JP    A-2006-195383    7/2006

*Primary Examiner* — Jack Dinh
(74) *Attorney, Agent, or Firm* — Oliff PLC

(57) ABSTRACT

An optical modulator includes a single-crystal substrate, a lithium niobate film formed on a main surface of the single-crystal substrate, the lithium niobate film being an epitaxial film and having a ridge, a buffer layer formed on the ridge, a first electrode formed on the buffer layer, and a second electrode separated from the first electrode, the second electrode being in contact with the lithium niobate film.

20 Claims, 8 Drawing Sheets

OPTICAL MODULATOR

BACKGROUND OF THE INVENTION

1. Field of the Invention

The present invention relates to an optical modulator for use in optical communication and optical measurement fields.

2. Description of the Related Art

With the spread of the Internet, communication traffic is increasing dramatically, and optical fiber communication is becoming very important. In optical fiber communication, electric signals are converted into optical signals, and the optical signals are transmitted through optical fibers. Optical fiber communication is characterized by broadband, low-loss signals with high resistance to noise.

Electric signals are converted into optical signals by direct modulation using a semiconductor laser or external modulation using an optical modulator. Although the direct modulation needs no optical modulator and is inexpensive, the direct modulation has a limited modulation rate. Thus, external modulation is used in high-speed long-distance applications.

In practically used optical modulators, an optical waveguide is formed by titanium (Ti) diffusion in the vicinity of a surface of a single-crystal lithium niobate substrate. High-speed optical modulators of 40 Gb/s or more are commercially available. However, these high-speed optical modulators have the drawback of having a length as long as approximately 10 cm.

Japanese Unexamined Patent Application Publication No. 2006-195383 discloses a Mach-Zehnder optical modulator that includes a c-axis oriented lithium niobate film as an optical waveguide. The lithium niobate film is formed by epitaxial growth on a single-crystal sapphire substrate.

However, this optical modulator including the lithium niobate film has the following problems. FIG. 15 is a cross-sectional view of an optical modulator 100 described in Japanese Unexamined Patent Application Publication No. 2006-195383. A lithium niobate film is formed by epitaxial growth on a sapphire substrate 21, and optical waveguides 22a and 22b each having a rectangular cross section are formed by fine patterning. The side surfaces and top surface of the optical waveguides 22a and 22b are surrounded by a $SiO_2$ buffer layer 23 (buried optical waveguides 22a and 22b). Electrodes 24a and 24b are disposed on the buffer layer 23 above the optical waveguides 22a and 22b. The $SiO_2$ buffer layer 23 has a relative dielectric constant of 4, which is much lower than the relative dielectric constant of 28 (parallel to the c-axis) or 43 (perpendicular to the c-axis) of the lithium niobate film. Thus, even when a voltage is applied between the electrodes 24a and 24b, a sufficient electric field is not formed in the optical waveguides 22a and 22b. This causes the problem of a high half-wave voltage $V\pi$. Although the half-wave voltage $V\pi$ can be lowered by increasing the electrode length L, this results in an increased size. Thus, the optical modulator has the problem of high $V\pi L$. Although the electric field applied to the optical waveguides 22a and 22b can be strengthened by using a material having a high relative dielectric constant for the buffer layer 23, this causes another problem of a low characteristic impedance Zc of the electrodes. Although the gap between the electrodes must be increased in order to maintain the characteristic impedance Zc, this weakens the electric field applied to the optical waveguides 22a and 22b.

SUMMARY OF THE INVENTION

In consideration of such situations, it is an object of the present invention to provide an optical modulator having a low $V\pi L$ while maintaining a predetermined characteristic impedance Zc of a traveling-wave electrode using a lithium niobate film formed by epitaxial growth on a single-crystal substrate.

The present invention provides an optical modulator that includes a single-crystal substrate, a lithium niobate film formed on a main surface of the single-crystal substrate, the lithium niobate film being an epitaxial film and having a ridge, a buffer layer formed on the ridge, a first electrode formed on the buffer layer, and a second electrode separated from the first electrode, the second electrode being in contact with the lithium niobate film. This structure allows an electric field to be efficiently applied to an optical waveguide and can decrease $V\pi L$ while maintaining the characteristic impedance Zc of a traveling-wave electrode.

The present invention can provide an optical modulator having a low $V\pi L$ while maintaining a predetermined characteristic impedance Zc of a traveling-wave electrode.

DESCRIPTION OF THE PREFERRED EMBODIMENTS

Preferred embodiments of the present invention will be described below. However, the present invention is not limited to these embodiments. The constituents described below include those that can be easily expected by a person skilled in the art and those that are substantially the same. These constituents can be appropriately combined. The explanatory views are schematic, and, for convenience of explanation, the relationship between the thickness and the in-plane dimensions in the explanatory views may be different from the relationship in the actual structure, provided that the advantages of the present embodiments can be achieved.

Figure 1:
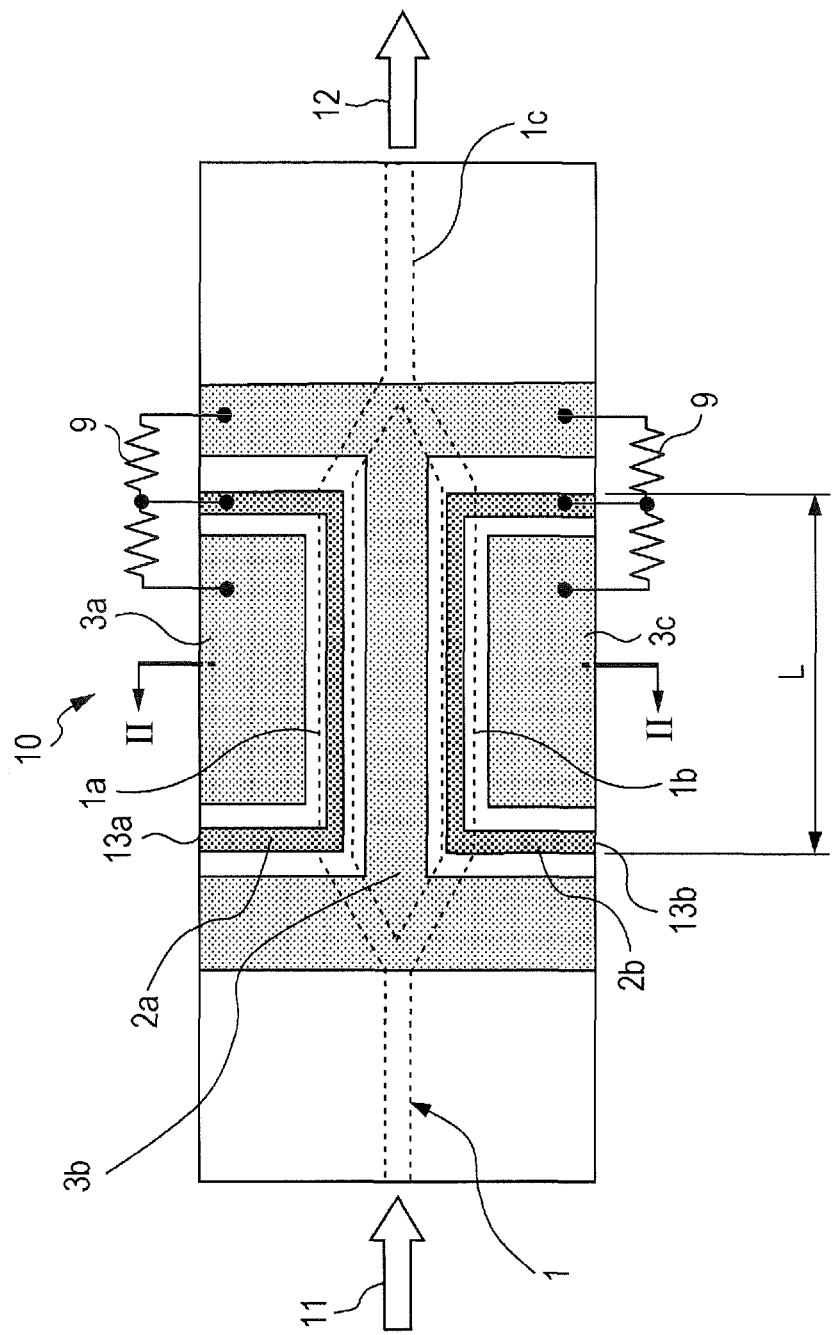
FIG. 1 is a plan view of an optical modulator according to a first embodiment.

A first embodiment will be described below with reference to the accompanying drawings. FIG. 1 is a plan view of a Mach-Zehnder optical modulator 10 (hereinafter simply referred to as the optical modulator 10) according to the first embodiment. The optical modulator 10 includes a Mach-Zehnder interferometer, which includes an optical waveguide 1 having an electro-optical effect. The optical modulator 10 can modulate light transmitted through the optical waveguide 1 by applying a voltage to the Mach-Zehnder interferometer. The optical waveguide 1 is divided into two optical waveguides 1a and 1b. First electrodes 2a and 2b are disposed on the optical waveguides 1a and 1b, respectively. Thus, the optical waveguide 1 has a dual electrode structure.

Figure 2:
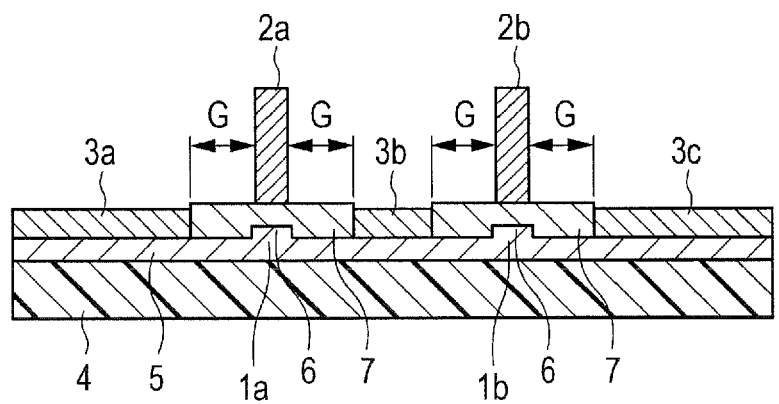
FIG. 2 is a cross-sectional view of the optical modulator according to the first embodiment.

FIG. 2 is a cross-sectional view of the optical modulator 10 according to the first embodiment taken along the line II-II in FIG. 1. A lithium niobate film 5 is formed by epitaxial growth on a main surface of the single-crystal substrate 4. The c-axis of the lithium niobate film 5 is perpendicular to the main surface of the single-crystal substrate 4. The lithium niobate film 5 has ridges 6, which function as the optical waveguides 1a and 1b. A buffer layer 7 having a relative dielectric constant $\in_1$ is disposed on the ridges 6. The first electrodes 2a and 2b are disposed on the buffer layers 7. Second electrodes 3a, 3b, and 3c are separated from the first electrodes 2a and 2b and are in contact with the top surface of the lithium niobate film 5. The buffer layers 7 are in contact with the second electrodes 3a, 3b, and 3c. Each distance between the first electrodes 2a and 2b and the second electrodes 3a, 3b, and 3c is referred to as a gap G.

The principle of operation of the optical modulator 10 will be described below. In FIG. 1, the two first electrodes 2a and 2b and the second electrodes 3a, 3b, and 3c are connected to each other through a termination resistor 9 and function as traveling-wave electrodes. The second electrodes 3a, 3b, and 3c function as ground electrodes. Complementary positive and negative signals are inputted through inputs 13a and 13b of the first electrodes 2a and 2b in the optical modulator 10. The complementary positive and negative signals have the same absolute value and the same phase. Since the lithium niobate film 5 has an electro-optical effect, an electric field applied to the optical waveguides 1a and 1b changes the refractive index of the optical waveguides 1a and 1b by $+\Delta n$ and $-\Delta n$, respectively, and thereby changes the phase difference between the optical waveguides 1a and 1b. The change in the phase difference allows intensity-modulated signal light to be outputted to an output 12 through an exit waveguide 1c of the optical modulator 10. When the phase difference between the optical waveguides 1a and 1b is an even multiple of $\pi$, this results in constructive interference of light. When the phase difference is an odd multiple of $\pi$, this results in destructive interference of light.

Figure 3:
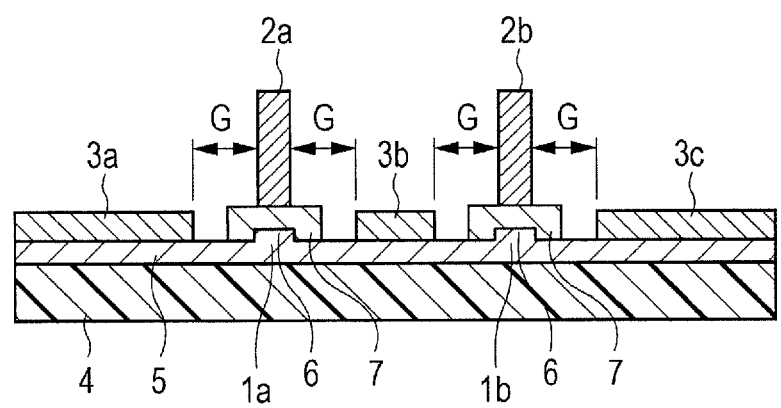
FIG. 3 is a cross-sectional view of an optical modulator according to a second embodiment.
Figure 4:
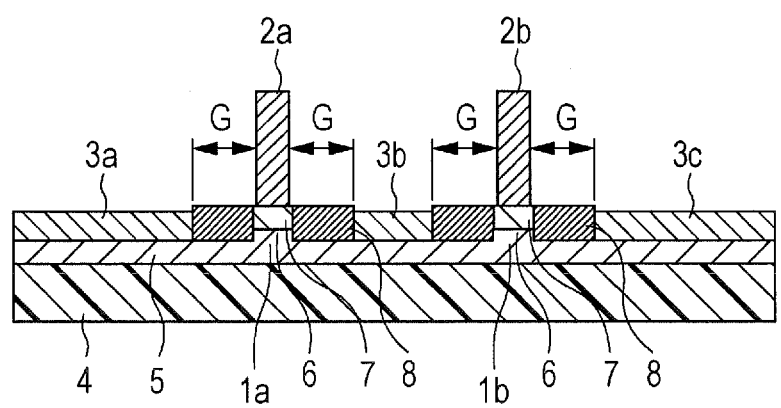
FIG. 4 is a cross-sectional view of an optical modulator according to a third embodiment.
Figure 5:
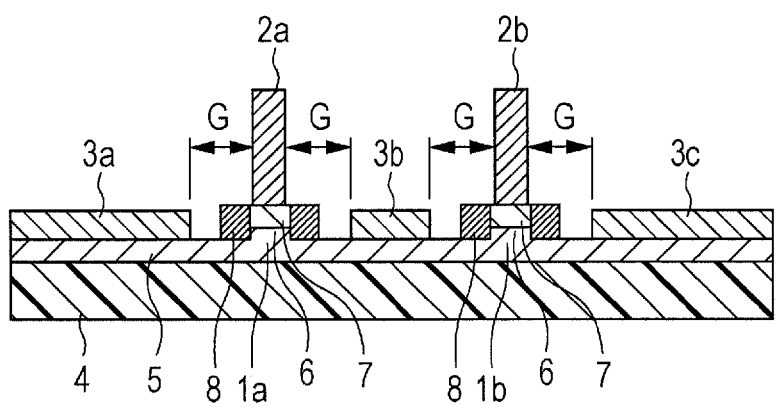
FIG. 5 is a cross-sectional view of an optical modulator according to a fourth embodiment.
Figure 6:
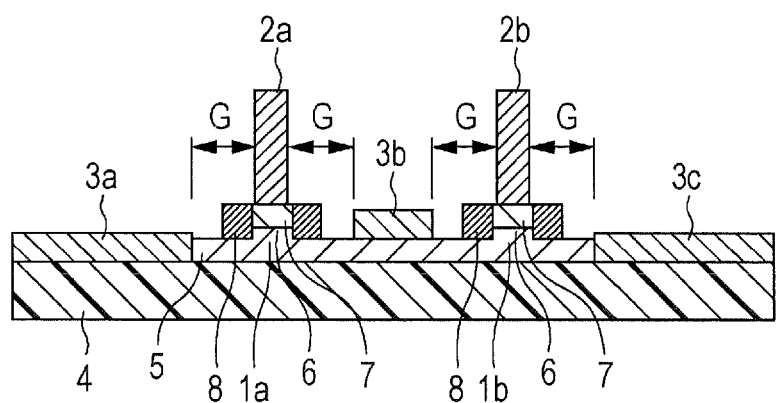
FIG. 6 is a cross-sectional view of an optical modulator according to a fifth embodiment.
Figure 7:
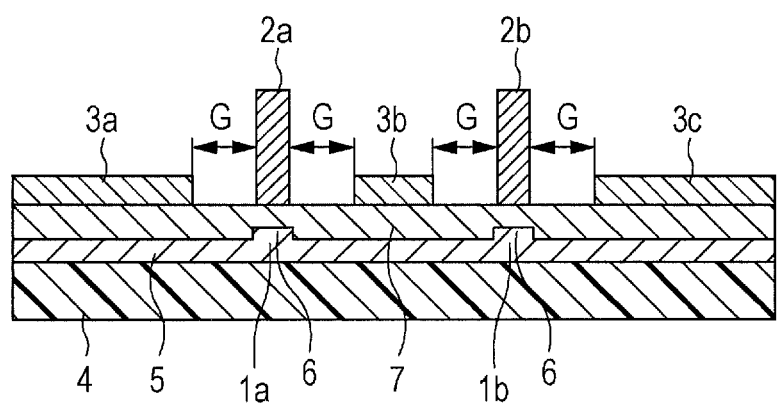
FIG. 7 is a cross-sectional view of a known optical modulator.

Comparison between the first to fifth embodiments and a conventional embodiment will be described in detail below. FIG. 3 is a cross-sectional view of the second embodiment. The second embodiment is different from the first embodiment in that the buffer layers 7 are separated from the second electrodes 3a, 3b, and 3c. The buffer layers 7 cover and protect the ridges 6 and can reduce damage and destruction of the ridges 6. FIG. 4 is a cross-sectional view of the third embodiment. The buffer layer 7 is formed only on the ridges 6. Dielectric layers 8 having a relative dielectric constant $\in_2$ are in contact with side surfaces of the buffer layers 7 and the ridges 6. The dielectric layers 8 are also in contact with the second electrodes 3a, 3b, and 3c. FIG. 5 is a cross-sectional view of the fourth embodiment. Like the third embodiment, the buffer layer 7 is formed only on the ridges 6. The dielectric layers 8 having a relative dielectric constant $\in_2$ are in contact with side surfaces of the buffer layers 7 and the ridges 6. Unlike the third embodiment, the dielectric layers 8 are not in contact with the second electrodes 3a, 3b, and 3c. FIG. 6 is a cross-sectional view of the fifth embodiment. The fifth embodiment is different from the fourth embodiment in that the second electrodes 3a, 3b, and 3c are disposed on the main surface of the single-crystal substrate 4 and are in contact with side surfaces of the lithium niobate films 5. FIG. 7 is a cross-sectional view of a conventional embodiment. The buffer layer 7 is disposed over the entire surface of the lithium niobate film 5. The second electrodes 3a, 3b, and 3c are disposed on the buffer layer 7.

In the optical modulator 10 of each of the embodiments, V$\pi$L and the characteristic impedance Zc of the traveling-wave electrodes were calculated while only the relative dielectric constant $\in_1$ of the buffer layer 7 and the gap G were changed. V$\pi$ refers to a half-wave voltage, is defined by the difference between the voltage V1 at which the optical output is maximum and the voltage V2 at which the optical output is minimum, and means the driving voltage. L refers to the length of the electrodes disposed on the waveguide having the ridges 6. V$\pi$ is inversely proportional to L. For example, for the constant product of V$\pi$ and L, a doubling of L leads to a halving of V$\pi$. The optical modulator 10 has a smaller size or a lower driving voltage as V$\pi$L decreases. In each of the embodiments, a smaller size means a shorter L. In FIG. 1, the dimension in the width direction is negligible as compared with L. In general, L ranges from several to 50 millimeters, whereas the distance between the waveguides 1a and 1b is 100 μm or less and is much smaller than L. In general, the ratio W/L of the dimension in the width direction (W) to L is 0.02 or more and 0.5 or less. In FIG. 1, the width direction is greatly enlarged relative to the length direction. The calculation conditions are as follows: each of the first electrodes 2a and 2b has a width of 2 μm and a thickness of 10 μm, each of the second electrodes 3a, 3b, and 3c has a thickness of 1.5 μm, the lithium niobate film 5 has a thickness of 1.5 μm, the buffer layer 7 has a thickness of 0.8 μm, each of the ridges 6 has a width of 2.5 μm and a height of 0.5 μm, the material of the single-crystal substrate 4 is sapphire, and the material of the electrodes is gold. The lithium niobate film 5 has a relative dielectric constant of 28 (parallel to the c-axis) or 43 (perpendicular to the c-axis), and the single-crystal substrate 4 has a relative dielectric constant of 10. Light incident from an input 11 of the optical waveguide 1 has a wavelength of 1550 nm. The buffer layer 7 in the second embodiment has a width of 4.5 μm. The dielectric layers 8 in the third to fifth embodiments have a relative dielectric constant $\in_2$ of 3. The dielectric layers 8 in the fourth and fifth embodiments have a width of 1 μm.

Figure 8:
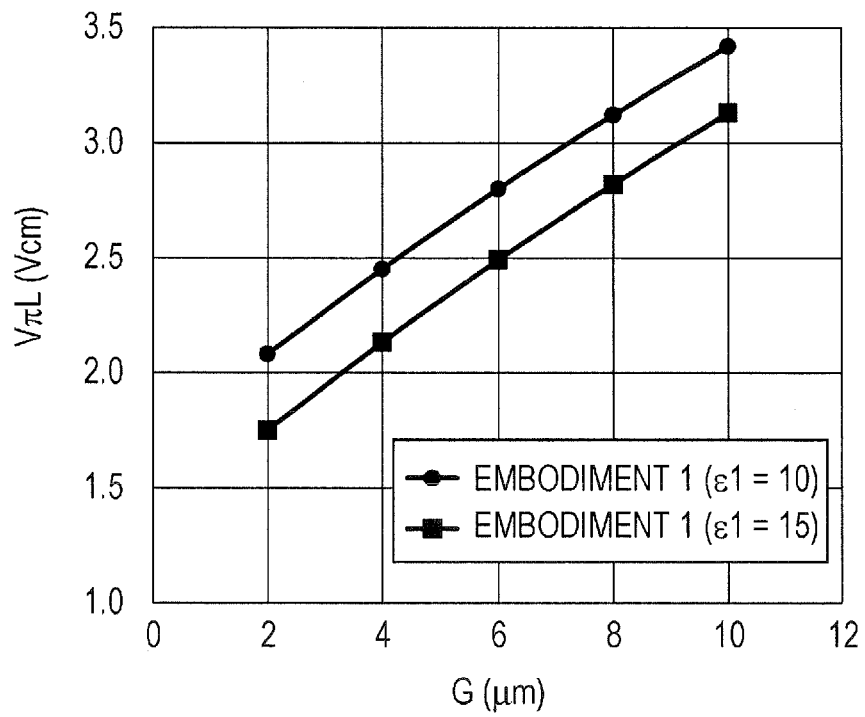
FIG. 8 is a graph of the calculation results for $V\pi L$.
Figure 9:
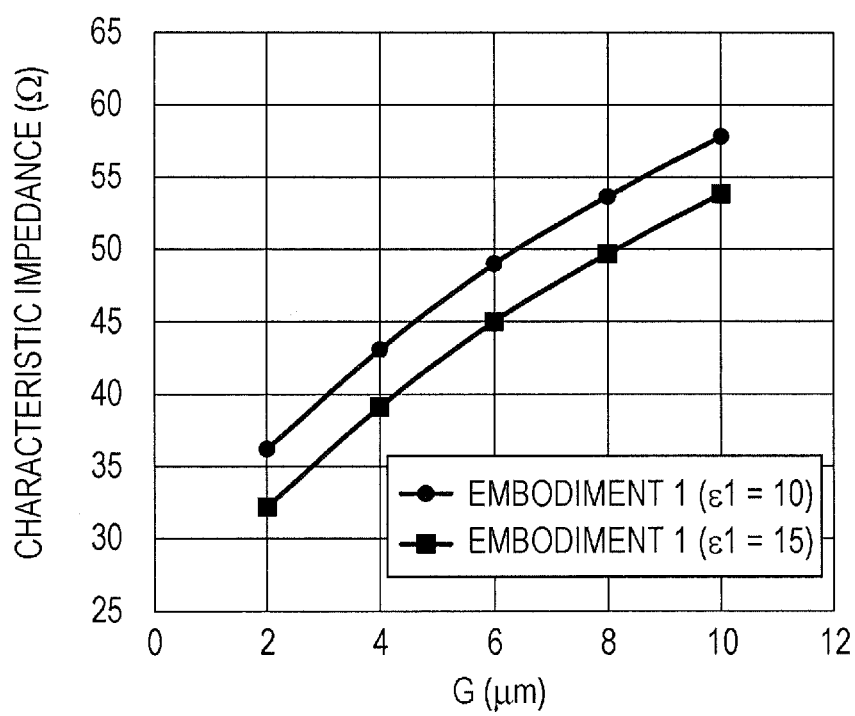
FIG. 9 is a graph of the calculation results for the characteristic impedance Zc.
Figure 10:
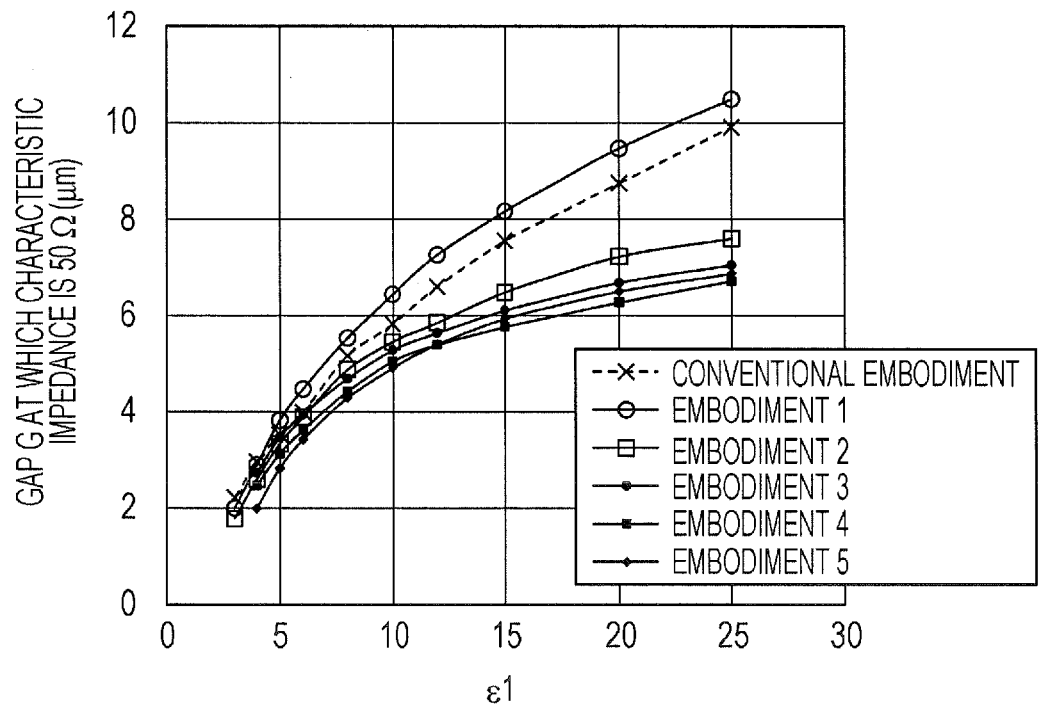
FIG. 10 is a graph of the calculation results for the gap at which the characteristic impedance Zc is 50 Ω.

FIG. 8 shows the calculation results for V$\pi$L as a function of the gap G in the first embodiment with $\in_1$=10 or 15. V$\pi$L can be reduced by narrowing the gap G or increasing the relative dielectric constant $\in_1$ of the buffer layer 7. FIG. 9 shows the calculation results for the characteristic impedance Zc of the traveling-wave electrodes. Narrowing the gap G or increasing the relative dielectric constant $\in_1$ results in a decreased characteristic impedance Zc. The characteristic impedance Zc need to be a predetermined value, in general, 50 Ω. FIG. 10 shows the calculation results for the gap G at which the characteristic impedance Zc is 50 Ω in each of the embodiments. With an increase in $\in_1$, the characteristic impedance Zc decreases, and the gap G must be increased. Different embodiments have different gap G values. V$\pi$L must be compared at the gap G at which the characteristic impedance Zc has a predetermined value.

Figure 11:
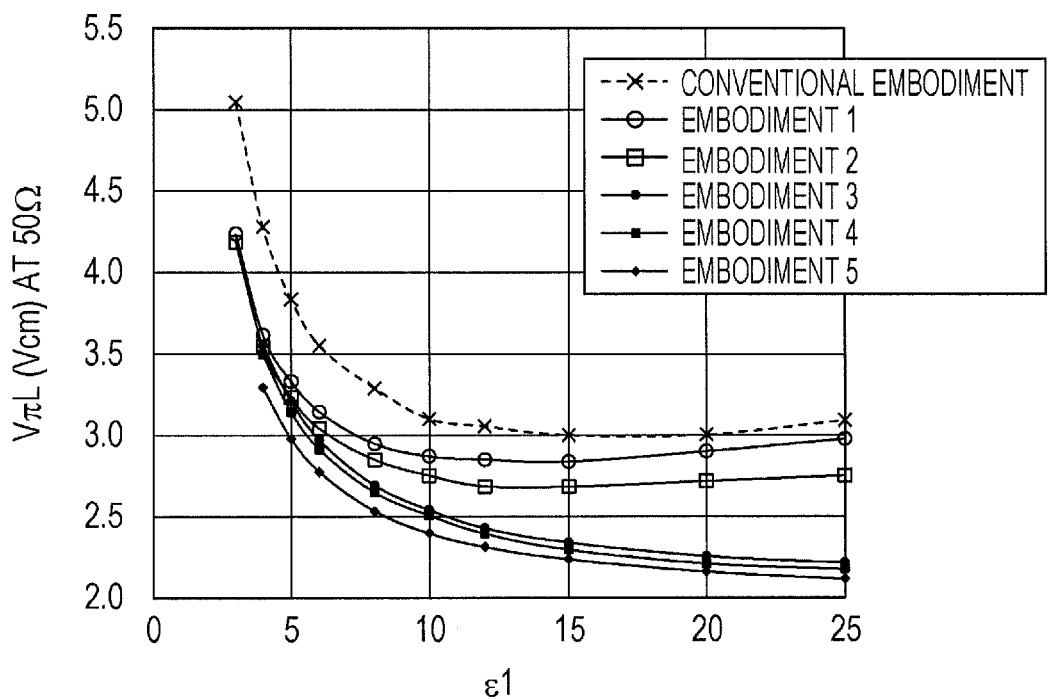
FIG. 11 is a graph of the calculation results for $V\pi L$ at which the characteristic impedance Zc is 50 Ω.

FIG. 11 shows the calculation results for V$\pi$L at the gap G at which the characteristic impedance Zc is 50 Ω. The horizontal axis represents $\in_1$. For $\in_1$ of 5 or more, V$\pi$L decreases in the following order: conventional embodiment>first embodiment>second embodiment>third embodiment>fourth embodiment>fifth embodiment. First, comparing the conventional embodiment with the first embodiment, the buffer layer 7 is disposed between the second electrodes 3a, 3b, and 3c and the lithium niobate film 5 in the conventional embodiment, whereas the second electrodes 3a, 3b, and 3c are in contact with the lithium niobate film 5 in the first embodiment. Thus, the electric field applied to the optical waveguides 1a and 1b is higher in the first embodiment than in the conventional embodiment, and VπL is lower in the first embodiment than in the conventional embodiment. The buffer layer 7 functions to decrease propagation loss in the optical waveguides 1a and 1b resulting from optical absorption of the first electrodes 2a and 2b. Thus, it is not necessary to dispose the buffer layer 7 between the second electrodes 3a, 3b, and 3c and the lithium niobate film 5.

Comparing the first embodiment with the second embodiment, the buffer layer 7 is narrower in the second embodiment than in the first embodiment, and the characteristic impedance Zc is higher in the second embodiment than in the first embodiment. Thus, as illustrated in FIG. 10, the gap G at which the characteristic impedance Zc is 50 Ω is smaller in the second embodiment than in the first embodiment, and VπL is lower in the second embodiment than in the first embodiment. Likewise, part of the buffer layers 7 in the first and second embodiments is replaced with the dielectric layers 8 having a low relative dielectric constant in the third and fourth embodiments. Thus, the third and fourth embodiments have an increased characteristic impedance Zc. Thus, as illustrated in FIG. 10, the gap G at which the characteristic impedance Zc is 50 Ω is smaller in the third and fourth embodiments than in the first and second embodiments, and VπL is lower in the third and fourth embodiments than in the first and second embodiments. At any $\in_1$, VπL is lower in the fourth embodiment than in the first to third embodiments. Thus, the fourth embodiment is preferred. At $\in_1$ of 6 or more, VπL is lower in the fourth embodiment by 5% or more than in the first embodiment. Thus, the fourth embodiment is particularly preferred. In the fifth embodiment, the second electrodes 3a, 3b, and 3c are disposed on the main surface of the single-crystal substrate 4 and are in contact with side surfaces of the lithium niobate film 5. Thus, an electric field applied to the optical waveguides 1a and 1b can be higher in the fifth embodiment than in the fourth embodiment, and VπL is still lower in the fifth embodiment.

At $\in_1$>15 in FIG. 11, VπL increases in the conventional embodiment and the first and second embodiments. An increase in $\in_1$ results in an increase in the gap at which the characteristic impedance is 50 Ω and correspondingly results in an increase in the applied voltage between the first electrodes 2a and 2b and the second electrodes 3a, 3b, and 3c required to change the refractive index of the lithium niobate film 5. The increase in VπL results from the fact that the effect of the increased voltage is greater than the effect of the decreased voltage due to the increased $\in_1$. In the third to fifth embodiments, in which the buffer layers 7 are disposed only on the ridges 6, an increase in $\in_1$ does not result in a significant decrease in the characteristic impedance Zc, and, as illustrated in FIG. 10, the gap at which the characteristic impedance Zc is 50 Ω is not significantly increased. Thus, in FIG. 11, VπL in the third to fifth embodiments decreases monotonously with $\in_1$.

Figure 12:
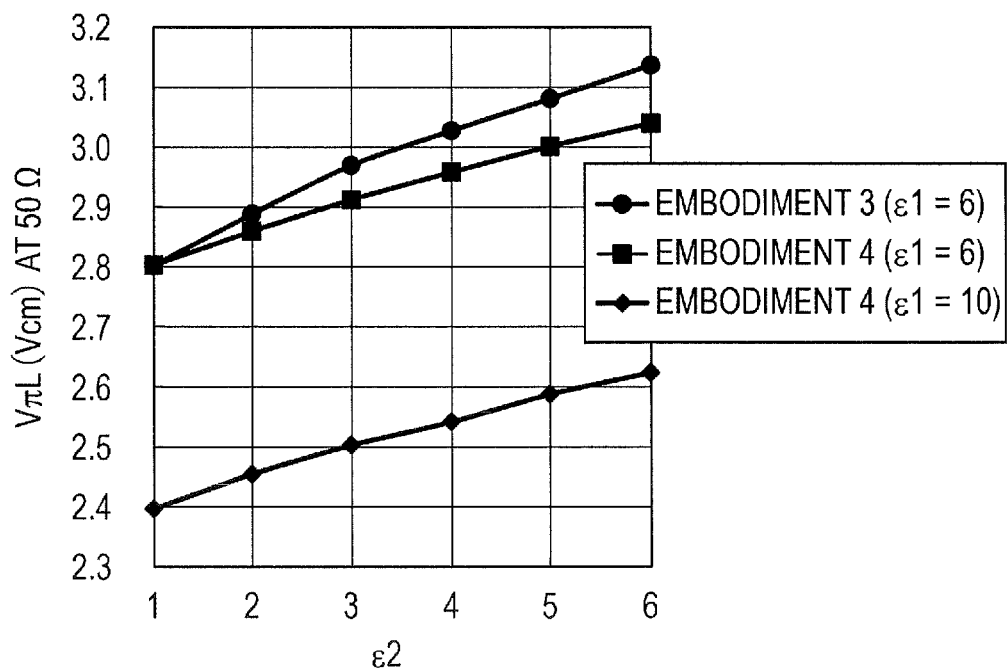
FIG. 12 is a graph of the calculation results for $V\pi L$ at which the characteristic impedance Zc is 50 Ω.

FIG. 12 shows the calculation results for VπL at which the characteristic impedance Zc is 50 Ω in the third embodiment ($\in_1$=6), the fourth embodiment ($\in_1$=6), and the fourth embodiment ($\in_1$=10). The horizontal axis represents the relative dielectric constant $\in_2$ of the dielectric layer. A decrease in $\in_2$ results in a decrease in VπL. This is because a decrease in $\in_2$ results in an increase in the characteristic impedance Zc and a decrease in the gap at 50 Ω. In the third embodiment ($\in_1$=6) and the fourth embodiment ($\in_1$=6), VπL is lower by 1.2% or more at $\in_2$ of 5 or less than at $\in_2$=6, which corresponds to the first and second embodiments. Thus, $\in_2$ of 5 or less is particularly preferred. Also in the fifth embodiment, a decrease in $\in_2$ results in a decrease in VπL.

Figure 13:
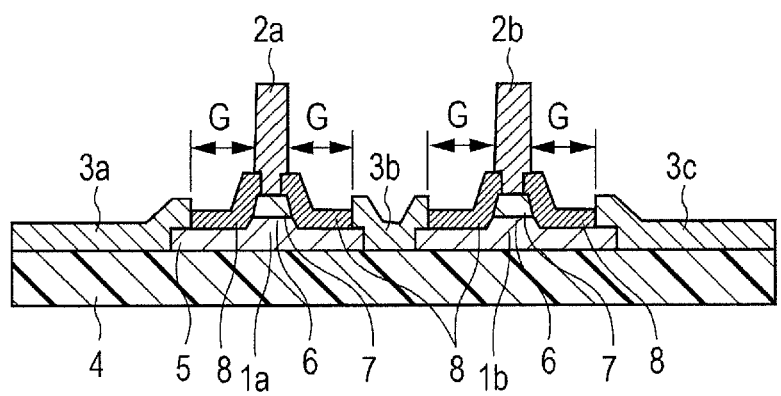
FIG. 13 is a cross-sectional view of an optical modulator according to a sixth embodiment.

FIG. 13 is a cross-sectional view of another embodiment (a sixth embodiment). The dielectric layers 8 are also in contact with the side surfaces of the first electrodes 2a and 2b so as to retain the first electrodes 2a and 2b. The second electrodes 3a, 3b, and 3c are in contact with the side surfaces and top surface of the lithium niobate films 5. The buffer layer 7 is disposed only on the ridges 6. Thus, like the fourth and fifth embodiments, VπL can be decreased. Furthermore, since the dielectric layers 8 retain the first electrodes 2a and 2b, this facilitates the manufacture of the optical modulator. The width of the first electrodes 2a and 2b may be changed in the thickness direction. In FIG. 13, the width of the first electrodes 2a and 2b is decreased in a lower portion thereof. In the sixth embodiment, the buffer layers 7 have a smaller width than the ridges 6. An upper portion of the first electrodes 2a and 2b may have a greater width than the ridges 6. Such embodiments also have the advantages of the present invention.

The constituents of the present invention will be described in detail below. The single-crystal substrate 4 may be any substrate on which the lithium niobate film 5 can be formed as an epitaxial film and is preferably a single-crystal sapphire substrate or a single-crystal silicon substrate. The single-crystal substrate 4 may have any crystal orientation. The lithium niobate film 5 can be easily formed as a c-axis oriented epitaxial film on single-crystal substrates 4 having different crystal orientations. Since the c-axis oriented lithium niobate film 5 has threefold symmetry, the underlying single-crystal substrate 4 preferably has the same symmetry. Thus, the single-crystal sapphire substrate preferably has a c-plane, and the single-crystal silicon substrate preferably has a (111) plane.

The term "epitaxial film", as used herein, refers to a film having the crystal orientation of the underlying substrate or film. The crystal of an epitaxial film is uniformly oriented along the X-axis and Y-axis on the film surface and along the Z-axis in the thickness direction. For example, an epitaxial film can be confirmed by first measuring the peak intensity at the orientation position by 2θ-θ X-ray diffraction and secondly observing poles.

More specifically, first, in the 2θ-θ X-ray diffraction measurement, all the peak intensities except for the target plane must be 10% or less, preferably 5% or less, of the maximum peak intensity on the target plane. For example, in a c-axis oriented epitaxial lithium niobate film, the peak intensities except for a (00L) plane are 10% or less, preferably 5% or less, of the maximum peak intensity on the (00L) plane. (00L) is a general term for (001), (002), and other equivalent planes.

Secondly, poles must be observed in the measurement. Under the condition where the peak intensities are measured at the first orientation position, only the orientation in a single direction is proved. Even if the first condition is satisfied, in the case of nonuniformity in the in-plane crystalline orientation, the X-ray intensity is not increased at a particular angle, and poles cannot be observed. Since $LiNbO_3$ has a trigonal crystal system, single-crystal $LiNbO_3$ (014) has 3 poles. For the lithium niobate film 5, it is known that crystals rotated 180 degrees about the c-axis are epitaxially grown in a symmetrically-coupled twin crystal state. In this case, three poles are symmetrically-coupled to form six poles. When the lithium niobate film 5 is formed on a single-crystal silicon substrate having a (100) plane, the substrate has fourfold symmetry, and 4×3=12 poles are observed. In the present invention, the lithium niobate film 5 epitaxially grown in the twin crystal state is also considered to be an epitaxial film.

The lithium niobate film 5 has a composition of $Li_xNbA_yO_z$. A denotes an element other than Li, Nb, and O. The number x ranges from 0.5 to 1.2, preferably 0.9 to 1.05. The number y ranges from 0 to 0.5. The number z ranges from 1.5 to 4, preferably 2.5 to 3.5. Examples of the element A include K, Na, Rb, Cs, Be, Mg, Ca, Sr, Ba, Ti, Zr, Hf, V, Cr, Mo, W, Fe, Co, Ni, Zn, Sc, and Ce, alone or in combination.

The lithium niobate film 5 preferably has a thickness of 2 µm or less. This is because a high-quality lithium niobate film having a thickness of more than 2 µm is difficult to form. The lithium niobate film 5 having an excessively small thickness cannot completely confine light, and light penetrates through the lithium niobate film 5 and is guided through the single-crystal substrate 4 or the buffer layers 7. Application of an electric field to the lithium niobate film 5 may therefore cause a small change in the effective refractive index of the optical waveguides 1a and 1b. Thus, the lithium niobate film 5 preferably has a thickness that is at least approximately one-tenth of the wavelength of light to be used.

The lithium niobate film 5 is preferably formed using a sputtering, chemical vapor deposition (CVD), or sol-gel process. Application of an electric field along the c-axis perpendicular to the main surface of the single-crystal substrate 4 can change the optical refractive index in proportion to the electric field. In the case of the single-crystal substrate 4 made of sapphire, the lithium niobate film 5 can be directly epitaxially grown on the single-crystal sapphire substrate. In the case of the single-crystal substrate 4 made of silicon, the lithium niobate film 5 is epitaxially grown on a clad layer (not shown). The clad layer (not shown) has a lower refractive index than the lithium niobate film 5 and should be suitable for epitaxial growth. For example, a high-quality lithium niobate film 5 can be formed on a clad layer (not shown) made of $Y_2O_3$.

The ridges 6 may have any shape that allows light to be guided, provided that the total thickness of each of the ridges 6 and the lithium niobate film 5 is greater than the thickness of the lithium niobate film 5 on either side of the ridges 6 perpendicular to the traveling direction of light. The ridges 6 may also be convex dome-shaped or triangular. In general, the ridges 6 are formed by etching the lithium niobate film 5.

The buffer layers 7 may be formed of any material that has a lower refractive index than the lithium niobate film 5 and high transparency, for example, $SiO_2$, $Al_2O_3$, $MgF_2$, $La_2O_3$, ZnO, $HfO_2$, MgO, $Y_2O_3$, or $CaF_2$. In order to achieve the advantages of the present invention, the material preferably has a relative dielectric constant $\in_1$ of 6 or more and is preferably $Al_2O_3$, $La_2O_3$, ZnO, $HfO_2$, MgO, $Y_2O_3$, or $CaF_2$. In order to reduce propagation loss in the optical waveguides 1a and 1b due to optical absorption by the electrodes, the buffer layers 7 must be disposed between the optical waveguides 1a and 1b and the first electrodes 2a and 2b. The thickness of the buffer layers 7 is preferably as large as possible in order to reduce optical absorption by the electrodes and is preferably as small as possible in order to apply a high electric field to the optical waveguides 1a and 1b. Because of such a trade-off between optical absorption by the electrodes and the applied voltage to the electrodes, the thickness of the buffer layers 7 depends on the purpose. The refractive index of the buffer layers 7 is preferably as low as possible in order to reduce the thickness of the buffer layers 7 and reduce $V\pi L$.

In general, materials having a high relative dielectric constant also have a high refractive index. Thus, considering the balance therebetween, it is important to select a material having a high relative dielectric constant and a relatively low refractive index. For example, $Al_2O_3$, which has a relative dielectric constant $\in_1$ of approximately 9 and a refractive index of approximately 1.6, is a preferred material. Particularly preferred are $LaAlO_3$, which has a relative dielectric constant $\in_1$ of approximately 13 and a refractive index of approximately 1.7, and $LaYO_3$, which has a relative dielectric constant $\in_1$ of approximately 17 and a refractive index of approximately 1.7.

The dielectric layers 8 have a lower relative dielectric constant than the buffer layers 7. In particular, materials having a low relative dielectric constant $\in_2$ of 5 or less are preferred. For example, inorganic materials, such as $SiO_2$, and resins having a low dielectric constant, such as polyimides and benzocyclobutene (BCB), may be used. The dielectric layers 8 must have a lower refractive index than the lithium niobate film 5 in order that the optical waveguides 1a and 1b can operate as optical waveguides. The materials having a low dielectric constant as described above have a refractive index in the range of 1.4 to 1.8, which is lower than the refractive index (2.14) of the lithium niobate film 5 and satisfies the operating condition of the optical waveguides. The role of the dielectric layers 8 is the protection of the ridges 6. Although the dielectric layers 8 may be in contact with the second electrodes 3a, 3b, and 3c, as in the fourth embodiment illustrated in FIG. 5 and the fifth embodiment illustrated in FIG. 6, the dielectric layers 8 are more preferably separated from the second electrodes 3a, 3b, and 3c in order to reduce $V\pi L$. As in the sixth embodiment illustrated in FIG. 13, the dielectric layers 8 may be in contact with the first electrodes 2a and 2b. In general, a lower relative dielectric constant of the dielectric layers 8 results in lower $V\pi L$, and a smaller area of the dielectric layers 8 results in lower $V\pi L$ because the air, which has a relative dielectric constant of approximately 1, occupies a larger area. The dielectric layers 8 protect the ridges 6 and can reduce damage and destruction of the ridges 6.

The materials of the first electrodes 2a and 2b and the second electrodes 3a, 3b, and 3c may be any materials having a high electrical conductivity. In order to reduce propagation loss of signals at high frequencies, electrically conductive metallic materials, such as Au, Cu, Ag, and Pt, are preferred. The first electrodes 2a and 2b preferably have substantially the same width as the ridges 6 in order to increase the electric field applied to the optical waveguides 1a and 1b. The first electrodes 2a and 2b preferably have a thickness of 2 µm or more in order to reduce propagation loss by the traveling-wave electrodes at high frequencies. The thickness of the second electrodes 3a, 3b, and 3c is preferably, but not limited to, smaller than the thickness of the first electrodes 2a and 2b in order to increase the characteristic impedance Zc. In order to increase the electric field applied to the optical waveguides 1a and 1b, the second electrodes 3a, 3b, and 3c are in contact with the lithium niobate film 5.

The structure of the electrodes may be modified variously. Although the principle of operation has been described in the first embodiment using the first electrodes 2a and 2b as signal electrodes and the second electrodes 3a, 3b, and 3c as ground electrodes, for example, the second electrode 3b or the second electrodes 3a and 3c may be omitted. Alternatively, the second electrode 3b may be omitted, and the first electrode 2a or 2b may be used as a ground electrode. Although complementary signals are inputted to the first electrodes 2a and 2b in the first embodiment, complementary signals may be inputted to one of the first electrodes 2a and 2b, and the other may be omitted. Furthermore, the same signals may be inputted instead of complementary signals by reversing the direction of polarization of the lithium niobate film 5 in the first electrodes 2a and 2b. Although the gaps G between the first electrodes 2a and 2b and the second electrodes 3a, 3b, and 3c are the same in the embodiments described above for the sake of simplicity, the gaps G may be different.

Although FIG. 11 shows the results under particular conditions, and VπL changes with parameters, the tendency in the results is unchanged, and the advantages of the present invention can be obtained. For example, when a single-crystal silicon substrate is used as the single-crystal substrate 4, substantially the same results can be obtained because silicon has a relative dielectric constant of 12, which is comparable to the relative dielectric constant (10) of sapphire. Variations in shape parameters, such as the width and thickness of the first electrodes 2a and 2b, the thickness of the second electrodes 3a, 3b, and 3c, the thickness of the lithium niobate film 5, the thickness of the buffer layer 7, or the width and height of the ridges 6, may change VπL but do not change the magnitude relation of VπL between the embodiments, and the present invention is valid.

Figure 14:
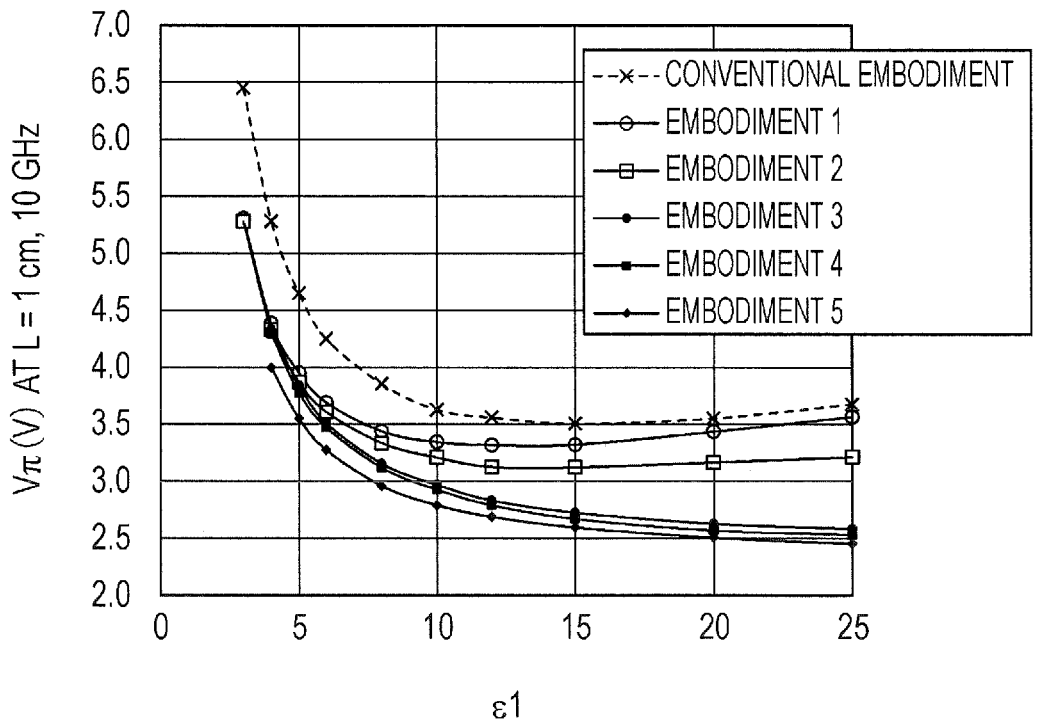
FIG. 14 is a graph of the calculation results for $V\pi L$ at L=1 cm and 10 GHz.
Figure 15:
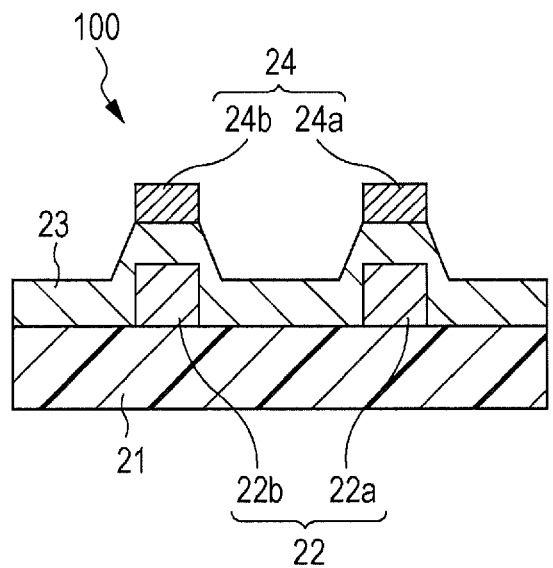
FIG. 15 is a cross-sectional view of a known optical modulator.

VπL in FIG. 11 is measured at a low frequency of 1 GHz or less. Although VπL at a driving frequency (generally 1 GHz or more) is practically important, VπL at a high frequency of 1 GHz or more also depends on L and the frequency because of the loss of electric signals transmitted through the traveling-wave electrodes and the difference in speed between optical signals and electric signals. In order to reduce VπL at a high frequency, VπL at a low frequency must first be reduced. Thus, VπL at a low frequency is used for comparison between the embodiments in FIG. 11. FIG. 14 shows the calculation results for VπL at L=1 cm and at a frequency of 10 GHz. The calculation conditions are the same as the calculation conditions for FIG. 11. Although Vπ in FIG. 14 is higher than Vπ at the low frequency shown in FIG. 11, the magnitude relation between the embodiments is unchanged. Thus, the present invention is valid at the practical high frequency. The relative dielectric constant should be the relative dielectric constant at the driving frequency. In general, the relative dielectric constant independent of the frequency is used on the assumption that the frequency dependence of the relative dielectric constant is small in the GHz band.

The advantages of the present invention will be described below with examples. However, the present invention is not limited to these examples.

EXAMPLES

The structure according to the sixth embodiment illustrated in FIG. 13 was test-manufactured in accordance with the following procedures. The material of the single-crystal substrate 4 was sapphire. The lithium niobate film 5 having a thickness of 1.5 µm was formed by sputtering on the single-crystal substrate 4. The buffer layer 7 having a thickness of 0.8 µm and formed of $LaAlO_3$ was then formed by vapor deposition on the lithium niobate film 5. The formation of the ridges 6 and patterning of the buffer layers were performed by the formation of a resist mask and Ar plasma dry etching. The ridges 6 had a width of 2.5 µm and a height of 0.4 µm. The dielectric layers 8 having a thickness of 0.7 µm and formed of $SiO_2$ were formed by CVD over the entire surface. A resist mask was formed again, and an unnecessary portion of the dielectric layers 8 was removed by dry etching. Finally, the first electrodes 2a and 2b and the second electrodes 3a, 3b, and 3c were formed using a photo process and a gold plating process. $LaAlO_3$ had a relative dielectric constant of 13, and $SiO_2$ had a relative dielectric constant of 4. The gap G was 6 µm, and the electrode length L was 14 mm.

The modulation characteristics of the optical modulator thus manufactured were evaluated using light having a wavelength of 1550 nm. As a result, the optical modulator according to the present example had a low VπL of 2.4 Vcm, thus demonstrating the advantages of the present invention.

An optical modulator according to the present invention can have a sufficiently low VπL and can realize high-precision optical communications in various applications in optical fiber communications and optical measurements.

What is claimed is:

1. An optical modulator, comprising:
    a single-crystal substrate;
    a lithium niobate film formed on a main surface of the single-crystal substrate, the lithium niobate film being an epitaxial film and having a ridge;
    a buffer layer formed on the ridge;
    a first electrode formed on the buffer layer; and
    a second electrode separated from the first electrode,
    the second electrode being in contact with the lithium niobate film.

2. The optical modulator according to claim 1, wherein the buffer layer is separated from the second electrode.

3. The optical modulator according to claim 2, further comprising a dielectric layer in contact with a side surface of the buffer layer and a side surface of the ridge, the dielectric layer having a lower relative dielectric constant than the buffer layer.

4. The optical modulator according to claim 3, wherein the second electrode is separated from the dielectric layer.

5. The optical modulator according to claim 4, wherein the first electrode is in contact with the dielectric layer.

6. The optical modulator according to claim 5, wherein the buffer layer has a relative dielectric constant of 6 or more, and the dielectric layer has a relative dielectric constant of 5 or less.

7. The optical modulator according to claim 6, wherein the second electrode is in contact with a side surface of the lithium niobate film.

8. The optical modulator according to claim 5, wherein the second electrode is in contact with a side surface of the lithium niobate film.

9. The optical modulator according to claim 4, wherein the buffer layer has a relative dielectric constant of 6 or more, and the dielectric layer has a relative dielectric constant of 5 or less.

10. The optical modulator according to claim 9, wherein the second electrode is in contact with a side surface of the lithium niobate film.

11. The optical modulator according to claim 4, wherein the second electrode is in contact with a side surface of the lithium niobate film.

12. The optical modulator according to claim 3, wherein the first electrode is in contact with the dielectric layer.

13. The optical modulator according to claim 12, wherein the buffer layer has a relative dielectric constant of 6 or more, and the dielectric layer has a relative dielectric constant of 5 or less.

14. The optical modulator according to claim 13, wherein the second electrode is in contact with a side surface of the lithium niobate film.

15. The optical modulator according to claim 12, wherein the second electrode is in contact with a side surface of the lithium niobate film.

16. The optical modulator according to claim 3, wherein the buffer layer has a relative dielectric constant of 6 or more, and the dielectric layer has a relative dielectric constant of 5 or less.

17. The optical modulator according to claim 16, wherein the second electrode is in contact with a side surface of the lithium niobate film.

18. The optical modulator according to claim 3, wherein the second electrode is in contact with a side surface of the lithium niobate film.

19. The optical modulator according to claim 2, wherein the second electrode is in contact with a side surface of the lithium niobate film.

20. The optical modulator according to claim 1, wherein the second electrode is in contact with a side surface of the lithium niobate film.

* * * * *